Patented Jan. 10, 1950

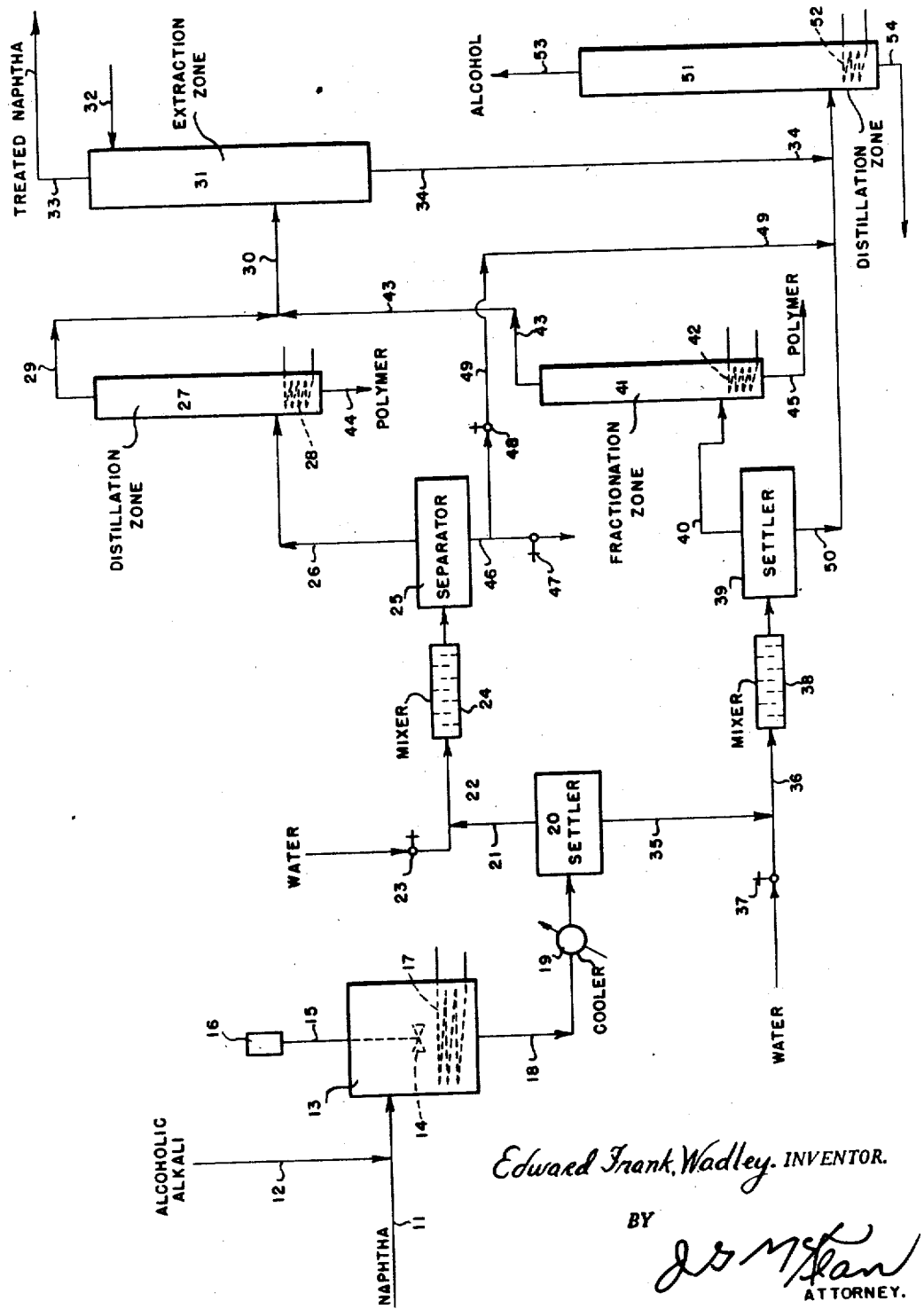

2,494,371

UNITED STATES PATENT OFFICE 2,494,371

METHOD FOR REMOVING OXYGENATED ORGANIC COMPOUNDS FROM HYDROCARBONS

Edward Frank Wadley, Baytown, Tex., assignor, by mesne assignments, to Standard Oil Development Company, Elizabeth, N. J., a corporation of Delaware Application October 17, 1947, Serial No. 780,504

2 Claims. (Cl. 196—41)

The present invention is directed to a method for removing oxygenated organic compounds from hydrocarbons containing them. More particularly, the invention is directed to the treatment of hydrocarbons obtained by reacting carbon monoxide and hydrogen in the presence of a catalyst.

The pioneering work by Fisher and Tropsch resulted in a process for producing hydrocarbons and oxygenated organic compounds from carbon monoxide and hydrogen by passing a mixture thereof over a suitable catalyst to cause a reaction between the materials. As a result of this work commercial processes have been developed to produce hydrocarbons and oxygenated organic compounds from carbon monoxide and hydrogen. The product from this synthesis reaction is a synthethic crude petroleum, but, unlike natural crude petroleum, it may contain a considerable quantity of oxygenated organic compounds such as the ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contaminated with oxygenated organic compounds are unsuitable in catalytic conversion processes is that the oxygenated organic compounds react with the catalyst usually employed, such as the Friedel-Crafts type catalyst. Not only do the oxygenated organic compounds react with the catalyst but they enter into reaction with the hydrocarbons and produce products of less attractive nature than the product resulting from the catalytic conversion of the hydrocarbons themselves. For example, polymers having lubricating oil qualities may be produced by polymerizing alpha olefins in the presence of aluminum chloride, but, if these alpha olefins are contaminated with oxygenated organic compounds, as when produced from carbon monoxide and hydrogen, the product is not satisfactory in that the lubricating oil qualities are depreciated by the presence of the oxygenated organic compounds. Furthermore, the oxygenated organic compounds react with the catalyst and destroy its activity requiring considerably larger quantities of catalysts to cause the reaction to proceed than would be required if the oxygenated compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents such as sulfur dioxide and the like and mixtures thereof. It has also been suggested to remove a portion of the oxygenated organic compounds by treatment of the naphtha with various chemical reagents. The prior art proposals have largely been unsatisfactory in that, while they are effective in removing a portion of the oxygenated organic contaminants in the naphtha, they are largely ineffective in substantially completely removing the oxygenated organic compounds. For example, it has been suggested to employ aqueous methanol as a solvent for the oxygenated organic compounds contained in hydrocarbons produced in the reaction between carbon monoxide and hydrogen. While the alcohols will effectively remove most of the oxygenated organic compounds, the esters and ketones are only very slightly soluble and, therefore, are very difficult to remove.

It has now been discovered that substantially all of the oxygenated organic compounds including esters contained in the hydrocarbon product formed in the reaction between carbon monoxide and hydrogen may be substantially removed by a combination of treatments including saponification of esters in the presence of alcoholic alkali at a high temperature, cooling the saponified hydrocarbons followed by extraction of the saponified hydrocarbon with an aqueous methanol, and dilution of the alcoholic solution separated from the saponified hydrocarbon with water so that the water content of the aqueous methanol is carefully controlled.

It is, therefore, the main object of the present invention to provide a process for removing oxygenated organic compounds from naphthas containing them by subjecting the naphtha to saponification and solvent extraction.

Another object of the present invention is to provide a process involving a series of treating steps in which a naphtha contaminated with oxygenated organic compounds is substantially freed of the contaminating compounds and the naphtha made suitable for catalytic conversion operations.

The objects of the present invention are achieved by subjecting a hydrocarbon, such as a mixture of hydrocarbons, or a fraction thereof, produced in the reaction between carbon monoxide and hydrogen over an iron-type catalyst to a treatment including saponification at high temperatures in the presence of an alcoholic-alkali solution, such as an alcoholic potassium hydroxide solution. The alcohol employed in the saponification is preferably methyl alcohol. Following the saponification, the saponified mixture is subjected to a cooling operation to reduce its temperature to substantially atmospheric temperature whereby a separation is effected into two phases. The hydrocarbon phase is washed with water and then distilled to remove high boiling polymers which may be formed in the saponification operation following which the distilled fraction, free of polymers, may be subjected to a solvent extraction with aqueous methanol to recover a treated naphtha substantially free of contaminating oxygenated organic compounds if the high temperature treatment does not remove all of the oxygenated organic compounds. The extract or alcoholic alkali phase then has added to it a critical amount of water to form a phase containing about 80 to 85 per cent by volume of alcohol which causes the separation of this phase into hydrocarbon and aqueous phases. The hydrocarbon phase is withdrawn and may then be subjected to solvent extraction with the raffinate phase while the separated aqueous phases may be combined and distilled with the solvent employed in the solvent extraction stage to recover the solvent.

The temperature at which the saponification is conducted will range from about 150° F. to about 600° F. with a preferred temperature of approximately 350° F. Conditions of intimate contact between the hydrocarbon and the alcoholic alkali solution are desirable.

The amount of alcoholic alkali solution employed in the saponification step will vary depending on the content of oxygenated organic compounds in the naphtha. Ordinarily, an amount of alcoholic alkali in the range from about one-half volume to about three volumes per volume of naphtha will suffice. The strength of the alcoholic alkali solution will vary depending on the content of the oxygenated organic compounds in the naphtha. Ordinarily, an amount of alcoholic alkali, such as sodium hydroxide or potassium hydroxide, ranging from about 2% to about 15%, based on the alcohol will be sufficient. For example, a solution of potassium hydroxide and methyl alcohol containing about 106 grams of potassium hydroxide per liter of methyl alcohol will give satisfactory treatment of a product containing as much as 20% of oxygenated organic compounds.

As mentioned before, the alkali may be either potassium hydroxide, sodium hydroxide, or lithium hydroxide while the alcohol is preferably methyl alcohol although ethyl alcohol may be employed under some conditions.

The invention will now be illustrated by reference to the drawing in which the sole figure presents a flow sheet of a preferred mode of practicing the invention.

Referring now to the drawing, numeral 11 designates a charge line through which a hydrocarbon fraction containing oxygenated organic compounds, such as ketones, aldehydes, organic acids, and esters, and boiling in the range between 85° F. and 400° F., is introduced into the system from a source not shown. An alcoholic solution of an alkali metal hydroxide, such as a solution of potassium hydroxide in methyl alcohol, is introduced into line 11 by line 12 and intermingles therewith. The mixture in line 11 then discharges into a saponification vessel 13 which is provided with an agitating means 14 operated through shaft 15 by prime mover 16. Saponification vessel 13 is also provided with a heating means illustrated by heating coil 17 for adjustment of the temperature in saponification vessel 13. After the mixture of naphtha and alcoholic alkali is introduced into the vessel 13, agitating means 14 is caused to operate and the temperature of the contents of vessel 13 is raised to a temperature preferably in the range between 300° and 400° F. to cause intimate contact between the hydrocarbon and the alcoholic solution at the elevated temperature. The hydrocarbon is allowed to remain in contact with the alcoholic solution at the high temperature for a time sufficient to cause saponification of the esters contained in the hydrocarbon. Usually, from about one-half up to 12 hours contact will be sufficient at the high temperatures employed. Ordinarily, however, less than one hour will suffice. The mixture of hydrocarbon and alcoholic alkali solution is withdrawn from vessel 13 by line 18 and is cooled to a temperature in the range from about 60° to 100° F. by passage through cooler 19. Cooling to a temperature in this range, usually atmospheric temperature, will cause the separation of the mixture into two layers under the influence of gravity in vessel 20 which is of sufficient capacity to allow the material to settle. The upper layer will contain the hydrocarbon and the lower layer will contain the alcoholic alkali solution. The upper hydrocarbon layer is withdrawn from vessel 20 by line 21 and is admixed with water added by line 22 and valve 23. The mixture of water and hydrocarbon passes through an incorporator 24 and into a separator 25 where, under the influence of gravity, a separation into a hydrocarbon layer and a water layer is effected. The hydrocarbon layer is discharged by line 26 into a distillation tower 27 which is provided with a heating means illustrated by coil 28 for adjustment of temperature and pressure therein. The hydrocarbon is distilled in distillation tower 27 to recover overhead by line 29 a fraction having a boiling range similar to the boiling range of the naphtha introduced by line 11 which is discharged by branch line 30 into a solvent extraction zone 31. In solvent extraction zone 31 the hydrocarbon, substantially free of esters, is contacted with a solvent such as aqueous methyl alcohol. The aqueous methyl alcohol is introduced into extraction zone 31 by line 32 and flows downwardly therein and contacts the up-flowing hydrocarbon and dissolves out the oxygenated organic compounds remaining therein. A treated naphtha substantially free of oxygenated organic compounds is removed from extraction zone 31 by line 33 while the solvent containing dissolved oxygenated organic compounds discharges from zone 31 by line 34 for further treatment as will be described.

The extract or alcoholic alkali layer withdrawn from settler 20 by line 35 has admixed with it in line 36 a critical amount of water which is introduced by opening valve 37. This critical amount of water is an amount sufficient to dilute the alcoholic alkali solution to a solution containing 80 to 85% methyl alcohol. The mixture of water, alcoholic alkali solution and dissolved compounds is intimately admixed in incorporator 38 and discharges into a settler 39 wherein, under the influence of gravity, a separation is effected between a hydrocarbon phase and an aqueous alcoholic phase. The hydrocarbon phase is withdrawn from settler 39 by line 40 and discharges into a distillation tower 41 provided with a heating coil 42 for adjustment of temperature and pressure. Conditions are adjusted in fractionation tower 41 to obtain overhead by line 43 a fraction corresponding in boiling range to the boiling range of the naphtha introduced by line 11. This fraction is admixed in line 30 with the fraction obtained by line 29 and is subjected to a solvent extraction in zone 31 as has been described.

The polymer withdrawn by line 44 from distillation zone 27 and by line 45 from distillation zone 41 may be withdrawn from the system and used for fuel or subjected to other processing operations as may be desired.

The aqueous phase in settler 25 may be discharged therefrom by line 46 controlled by valve 47. Alternatively, however, this layer may be admixed with the solvent withdrawn from zone 31 by line 34 by opening valve 48 in line 49 and further processed as will be described.

The aqueous alcoholic layer separated in settling zone 39 from the hydrocarbon discharges from settler 39 by line 50 and may have admixed with it the aqueous layer withdrawn from settler 25 by lines 46 and 49 as well as the solvent withdrawn by line 34. The combined aqueous and alcoholic solutions may then discharge by line 50 into a distillation zone 51 provided with a heating coil or other heating means 52 for adjustment of temperature and pressure therein and to distill off the alcohol for recovery by line 53. This alcohol may then be used, after dilution with water, as the solvent in zone 31 or may have added to it an alkali metal hydroxide and used in treating the naphtha in line 11 as has been described. The water and alkali metal hydroxide containing the contaminating oxygenated organic compounds originally contained in the hydrocarbon are withdrawn from the system by way of line 54.

The amount of water added to cause a separation between the hydrocarbons contained in the alcoholic alkali solution is quite critical and should be carefully controlled. The addition of too little water, for example a ratio of methyl alcohol to water greater than 6:1, would result in incomplete separation of hydrocarbon and would seriously affect the yield of product while the addition of too much water, for example a ratio of methyl alcohol to water less than 3:1, would cause oil-soluble oxygenated organic compounds to return to the hydrocarbon layer. Thus, it is important that the amount of water added to cause separation of hydrocarbons contained in the saponified product be carefully controlled. Preferably, the ratio of alcohol to water should be about 4:1 although some leeway in this respect is allowed.

The invention will be further illustrated by the following run in which a product obtained by the synthesis of carbon monoxide and hydrogen over an iron-type catalyst was washed with an aqueous sodium hydroxide solution. The treated solution was then distilled to obtain a fraction boiling from about 85° to about 450° F. which represents approximately 74% by volume of the treated naphtha. Three volumes of the distilled fraction were then agitated for one hour with two volumes of a methyl alcohol-potassium hydroxide solution containing 106 grams of potassium hydroxide per liter of methyl alcohol at a temperature of approximately 350° F. After the treating time mentioned, the mixture was cooled to room temperature, which was above 85° F. On cooling, the mixture separated into two phases: a hydrocarbon phase and an alcoholic phase. The hydrocarbon phase, representing 83% by volume of the distilled naphtha, was then washed with water and distilled to obtain a 91% yield as an overhead fraction, the remainder being a high boiling polymer having a boiling range above 450° F. The alcoholic phase was then diluted with sufficient water to form aqueous alcoholic solution containing 80% to 83% methyl alcohol. This caused the alcoholic solution to separate into a hydrocarbon layer and an aqueous alcoholic layer. The hydrocarbon layer was withdrawn, washed with water and distilled to obtain a fraction corresponding to 95 volume per cent overhead, the remainder again being a heavy polymer outside the boiling range of the original naphtha. Taking the hydrocarbon separated from the original hydrocarbon layer and the hydrocarbon separated from the alcoholic layer, a yield of naphtha amounting to 92.2 volume per cent of the originally distilled naphtha was obtained. The two hydrocarbon fractions representing, respectively, 91% and 95% overhead fractions were then separately subjected to extractions with aqueous methyl alcohol having a strength of about 80 volume per cent of methyl alcohol. The two extracted oils were washed with water and blended to form a finished stock. Analyses of the feed stock to the process before saponification and the two fractions before solvent extraction are given in the following table along with the analysis of the combined blend:

Table I

|  | Charge to Saponification | 91% Overhead Recovered from First Separation | | 95% Overhead Recovered from Ext. Layer by Controlled Addition of Water | | Fin. Ext. Blend |
| --- | --- | --- | --- | --- | --- | --- |
|  |  | Before CH₃OH Ext. | After CH₃OH Ext. | Before CH₃OH Ext. | After CH₃OH Ext. |  |
| Wt. Percent Oxygenated Organic Compounds: |  |  |  |  |  |  |
| Alcohols | 0.0 | Nil | Nil | 1.0 | Nil | Nil |
| Aldehydes | 1.5 | Nil | Nil | Nil | Nil | Nil |
| Acids | 1.5 | Nil | Nil | Nil | Nil | Nil |
| Esters | 5.0 | Nil | Nil | Nil | Nil | Nil |
| Ketones | 8.7 | 1.0 | 0.15 | 1.5 | 0.18 | 0.18 |

It will be seen from a comparison of the analyses of the feed stocks with the analyses of the two fractions before and after extraction with methyl alcohol that the amount of oxygenated organic compounds has been reduced to a negligible figure.

The finished blend, representing the material having the analysis in the extreme right-hand column of the table, was then polymerized in the presence of aluminum chloride at a temperature of 77° F. The polymer produced under this treatment was separated from unreacted hydrocarbons. The inspection characteristics of the polymer are presented in Table II.

Table II

| | |
|---|---|
| S. S. U. viscosity at 210° F | 86.2 |
| S. S. U. viscosity at 100° F | 999 |
| Viscosity index | 91.3 |
| Open cup flash, °F | 410 |

It will be seen that the product resulting from the polymerization of the material treated in accordance with the present invention has a high flash, a high viscosity index, and is suitable for use as a lubricating oil.

Although not shown in the data presented in Table II, the amount of aluminum chloride required to polymerize the treated product to a polymer having lubricating oil qualities was only 50% to 55% of that normally required to treat naphthas produced in the reaction between carbon monoxide and hydrogen which had been treated in the conventional manner such as by percolation through silica gel. This is a substantial savings in catalyst requirements.

The nature and objects of the present invention, having been fully described and illustrated, what I wish to claim as new and useful and to secure by Letters Patent is:

1. A method for treating hydrocarbons contaminated with organic acids, esters, ketones, alcohols, and aldehydes which comprises admixing the contaminated hydrocarbon with a solution of an alkali metal hydroxide in anhydrous methyl alcohol at a temperature in the range between 150° and 600° F. for a time in the range from 0.5 to 12 hours to cause substantially complete saponification of said contaminating compounds, subsequently settling the admixture to separate a hydrocarbon phase therefrom, and contacting said phase with an alcoholic solvent to recover hydrocarbons substantially free of said contaminating compounds.

2. A method in accordance with claim 1 in which the alkali metal hydroxide is potassium hydroxide and the alcoholic solvent is methyl alcohol.

EDWARD FRANK WADLEY.

REFERENCES CITED

The following references are of record in the file of this patent:

UNITED STATES PATENTS

| Number | Name | Date |
|---|---|---|
| 1,796,621 | Ramage | Mar. 17, 1931 |
| 1,833,331 | Park | Nov. 24, 1931 |
| 2,153,302 | Ewing | Apr. 4, 1939 |